United States Patent [19]
Anderson

[11] Patent Number: 5,164,417
[45] Date of Patent: Nov. 17, 1992

[54] PHOSPHATE ESTER FLAME RETARDANT MIXTURE AND FOAMED RESINS CONTAINING SAME

[75] Inventor: James J. Anderson, Richmond, Va.

[73] Assignee: Albright & Wilson Americas Inc., Ashland, Va.

[21] Appl. No.: 777,425

[22] Filed: Oct. 10, 1991

Related U.S. Application Data

[63] Continuation of Ser. No. 533,011, Jun. 1, 1990, abandoned.

[51] Int. Cl.$^5$ .............................................. C08G 18/14
[52] U.S. Cl. .................................... 521/107; 252/609
[58] Field of Search ......................... 521/107; 252/609

[56] References Cited

U.S. PATENT DOCUMENTS 4,565,833 1/1986 Buszard et al. ..................... 521/107

FOREIGN PATENT DOCUMENTS 0428221 5/1991 European Pat. Off. .
60-133018 7/1985 Japan .

Primary Examiner—Maurice J. Welsh
Attorney, Agent, or Firm—Frishauf, Holtz, Goodman & Woodward

[57] ABSTRACT

A flame retardant composition, for use in flexible urethane foams, which contains about 5 to 95% of tris(-monochloroalkyl, dichloroalkyl or mixtures thereof) phosphate and the remainder is a phenyl phosphate ester which is an alkylated triphenyl phosphate having an approximate average formula $(R_xArO)_3PO$ wherein x ranges from 1 to 2, each R is individually selected from the group consisting of hydrogen, $C_1$-$C_4$ alkyl and Ar is phenyl. Flexible urethane foam compositions containing 8 to 14 parts per 100 parts polyol of this composition have sufficient flame retardant properties to meet the Cal 117 test standard.

22 Claims, No Drawings

PHOSPHATE ESTER FLAME RETARDANT MIXTURE AND FOAMED RESINS CONTAINING SAME

This application is a Continuation of application Ser. No. 07/533,011, filed Jun. 1, 1990 (abandoned).

BACKGROUND OF THE INVENTION

The present invention is a novel mixture of phosphate esters. The mixture has been found particularly useful in providing flame retardant characteristics to various flexible foamed polyester and polyether urethane compositions. The invention is therefor also a flexible polyether or polyester foam containing the flame-retardant composition of the present invention in an effective amount.

DESCRIPTION OF THE PRIOR ART

The components which make up the novel composition of the present invention have been known for use with flexible foam polymers almost from the beginning of the technology about 30 or 40 years ago.

One component of the inventive composition is a alkylated triphenyl phosphate which contains alkylated phenyl ester groups. A product available from Ciba-Geigy as PLIABRAC 519 (trademark) is readily available commercially and can be used for this component. In essence it is a triaryl phosphate containing a mixture of isomers which, on the average contain one isopropyl phenyl group per molecule. However, the mixture contains some phenyl esters and multiply alkylated phenyl esters. Also, the position of the isopropyl groups varies. At present this mixture is sold for use primarily as a plasticizer for polyvinylchloride. The mixture can be made in accordance with the procedures set forth in U.S. Pat. No. 3,576,923 to Randell et al (assigned to J.R. Geigy A.G.. Basel. Switzerland). A typical analysis of PLIABRAC 519 follows:

| | |
|---|---|
| O—Cresol | 0.03 max |
| Triphenyl Phosphate | 23.2% |
| Diphenyl 2-isopropyl-phenyl phosphate | 28.9% |
| Diphenyl 3-isopropyl-phenyl phosphate | 3.8% |
| Diphenyl 4-isopropyl-phenyl phosphate | |
| Di 2-isopropylphenyl phenyl phosphate | 13.2% |
| 2,4-disopropylphenyl diphenyl phosphate | 10.8% |
| 2-isopropylphenyl 3-isopropylphenyl phenyl phosphate | |
| Tri 2-isopropylphenyl phosphate | 8.0% |
| Di 3-isopropylphenyl phenyl phosphate | |
| 2-isopropylphenyl 4-isopropylphenyl phenyl phosphate | 4.3% |
| 2,4-disopropylphenyl 2-isopropylphenyl phenyl phosphate 3-isopropyl-phenyl 4-iso-propylphenyl phenyl phosphate | |
| Di 4-isopropylphenyl phenyl phosphate | 3% |
| Di-2-isopropylphenyl 2,4-disopropylphenyl phosphate | |
| Tri 3-isopropylphenyl phosphate | 2.8% |
| Di 3-isopropylphenyl 4-isopropylphenyl phosphate | 1.1% |
| Di 2,4-disopropylphenyl phenyl phosphate | |
| Di 4-isopropylphenyl 3-isopropylphenyl phosphate | 0.4% |
| Tri 4-isopropylphenyl phosphate | 0.1% |
| Tri 2 4-disopropylphenyl phosphate | 0.4% |

About 30 years ago phenyl phosphate esters and in particular trialkaryl and triaryl phosphates were used as flame-retardants for polyesters but this was discontinued when better, more efficient products became available.

U.S. Pat. No. 2,960,524 to Wilson is another patent which describes a method of making propylated (or isopropylated or 2-propylated) aryl phosphate esters which are useful in the practice of the present invention. This patent describes the propylated aryl phosphate esters as having found utility as plasticizers for polyvinylchloride plastics and as addition agents to gasoline. The patent describes a method of preparing these materials using a particular catalytic reaction.

U.S. Pat. No. 4,139,487 also describes mixed triaryl (phenyl and alkylphenyl) phosphate esters which are useful for the practice of this invention.

The abbreviation (PAP) is sometimes used by persons in this art for this component, and will be used below (Propylated Aryl Phosphates) on occasion for convenience.

The second component is a tris (monochloroalkyl or dichloroalkyl or mixtures thereof) phosphate ester, for example, a tris (1,3-dichloro-2-propyl phosphate), to be referred to as TDCP.

A number of products available from Albright & Wilson Americas under their trademark ANTIBLAZE are useful as the second component for the present invention. These are commercially available products sold as flame-retardants. One product ANTIBLAZE 195 brand flame-retardant (trademark) is primarily a tris(1,3-dichloropropyl) phosphate. A monochloropropyl product which is quite similar is also available as ANTIBLAZE 80 (trademark). A further useful product available as ANTIBLAZE 100 (trademark) is a similar product containing monochlorinated ethoxy groups but has been formed into what can loosely be considered a dimeric type compound having the following formula in order to provide the necessary low volatility required for some flame-retardant uses:

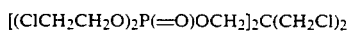

Although these compounds have been known for a long time, applicants are only aware of one previous publication wherein the two components were introduced into a foam to provide fire retardant properties. This was in Japanese Patent Application Disclosure SHO-60-133018. The Japanese Patent Disclosure is directed to a method for manufacturing flame-resistant polyurethane foams which is characterized in containing, among other compounds, 5 to 15 parts by weight of a component which is the same or analogous to the chlorinated alkyl phosphates (TDCP) component described above and 10 to 30 parts by weight of propylated triaryl phosphate (PAP) for each 100 parts by weight of polyether polyol being reacted to form the polyurethane foam.

The Japanese Patent Disclosure SHO-60-133018 teaches that, to meet the flame test for use in automotive products (MVSS 302 flame resistance tests) it is necessary that there be at least 10 parts by weight PAP. Unless at least 10 parts by weight PAP are present, insufficient flame resistance occurs. The upper limit of 30 parts by weight will still result in sufficient flame resistance to meet the MVSS test (Motor Vehicle Safety Standard) while going above this amount becomes uneconomical.

U.S. Pat. No. 4,746,682 is of interest with respect to the present application because it concerns a mixture of flame-retardant components for flexible polyurethane foams which include alkylated triaryl phosphate esters as one component. However, the primary component is a brominated diphenyloxide.

The meaning of the term "flame-retardant" is important for understanding the present invention. The Japanese Patent Application SHO-60-133018 discussed above refers to the Motor Vehicle Safety Standard (MVSS) which is a much less stringent test than is described in U.S. Pat. No. 4,746,682 to Green. The test described in U.S. Pat. No. 4,746,682 is the California Bulletin 117 Test frequently referred to as "California 117" or "Cal 117" Standard. It is this standard for which the present invention is primarily intended to be applied. This is the standard used, e.g. for furniture cushions and involves both a vertical flame test and a smoldering test. The smoldering test measures the amount of charring caused by a smoldering cigarette (as weight % retained). The vertical flame test measures the extent of charring (inches) and the amount of afterburning. The test involves suspending a defined piece or specimen of the foam over an open flame and then removing the flame and observing the results.

Passing the California 117 Standard is the measure of flame retardancy in the context of the present application.

The dual test required by California 117 Standard creates opposing problems. To meet the vertical flame test requirement, large amounts of flame retardants are usually needed. However, it was found that when large amounts of most phosphorus containing flame retardants effective for meeting the vertical test requirements are present, the susceptibility to smoldering or charring increased to the extent of failing the smolder test.

In the prior art, it was necessary to compromise flame retardant characteristics in order to meet the dual Cal 117 standard.

The manufacture of flexible foams, and in particular polyurethane foams, requires mixing components (e.g. isocyanates and polyols along with various surfactants, water, auxiliary blowing agents, catalysts etc., depending on the foam to be produced, its density and cell structure) and causing or allowing them to react. Modern equipment or techniques involve metering components into a reaction chamber wherein they are mixed and passed onto a conveyor or in a mold where the mixture is allowed to foam. Flame retardants are metered into the reaction chamber along with the other components for mixing. Because there can be variations across a run, the manufacturers of flexible foams prefer (and therefore will favor the purchase of) flame retardants which are as effective as possible to meet the required dual flame and smoldering standards. More effective flame retardants allow for greater tolerance of variation within the sample while still meeting the standards of the flame retardancy test. The Cal 117 test is run on five samples out of perhaps hundreds or thousands of feet of foam and, if more than one sample fails either test, the whole run of foam is considered to fail. If only one sample fails, it is permissible to run the test once again. A failure of one on the second run is failure of the whole run. Thus, from a practical or economic point of view, it is important to provide flame retardant compositions which can provide results which are well above the minimum standards of the flame tests and which give highly consistent results.

A further practical disadvantage in the manufacture of flexible foams is that large buns of foam are produced and then set aside to cure or to complete the polymerization reaction. Temperatures within the bun from the reaction can reach 150° to 180° C. and higher. The insulating properties of the foam maintain this temperature in the interior of the bun for an extended period of time. Thus, components which are introduced into the foam, including the flame retardant components, must be able to withstand high temperatures and not cause scorching or charring to be visible in the foam.

Rapid cure times are also desirable because the foams are stored in an expanded open condition until cure is complete. This results in a need for large storage space for curing inventory. Flame retardants of this invention do not require excessive storage time prior to cutting and shipping in a compressed state.

Concerning polyester foams, a particular problem with flame retardants used in polyesters is that many of the known flame retardants are not highly stable to hydrolysis from moisture in the air or otherwise, to elevated temperatures or to both. The result of hydrolysis is the production of acids which can cause an acid catalyzed breakdown of the ester portion of the urethane polymer. The flexible foam usually disintegrates as a result. Thus, the use of sufficient amounts of flame retardants in polyesters, in the past, has sometimes led to embrittlement or destruction of the polyester foam product.

Objects of the present invention include providing a flame retardant which can be easily handled, does not freeze during shipment or storage and provides consistent flame retardant properties which meet required flame retardant standards. Reasonable cure times should be maintained.

For use in polyester polyol based polyurethane foams, the flame retardant should be hydrolytically stable to resist causing the acid catalyzed breakdown of polyesters.

SUMMARY OF THE INVENTION

The present invention provides a flame retardant which is a mixture of a (chlorinated alkyl) phosphate and an alkylated triphenyl phosphate having an average formula $(R_xArO)_3PO$ wherein x ranges from 1 to 2, each R is individually selected from the group consisting of hydrogen or $C_1$–$C_4$ alkyl, the alkyl is preferably a secondary alkyl, and the Ar is phenyl. The alkylated triphenyl phosphates, as noted above in the analysis of PLIABRAC 519, may be a commercially prepared mixture. By "average formula" it is intended to include all the various components of a mixture such as PLIA-BRAC 519, including multiply alkylated phenyls and different isomers.

The invention also provides a urethane foam containing these components in amounts of from about 2 to 8 parts by weight of the alkylated triaryl phosphate component and about 4 to 12 parts by weight of the (chlorinated alkyl) phosphate components per 100 parts polyol component of the urethane.

The present invention most preferably provides a mixture of the two components to be used in metering it to the reaction mixture for the final foam product. However, it is possible to introduce the two components separately as long as the required amounts and ratios of components are complied with. Some of the consistency advantage gained by the use of the blend may be lost however, when adding a high viscosity component such as TDCP separately.

DETAILED DESCRIPTION

The following shows the effectiveness of the present invention.

Flexible Polyurethane Foams

A polyurethane foam is characterized in that raw material containing polyester polyol, organic isocyanate, water, catalysts, foaming control agent, and other necessary additives are combined and mixed, and the mixture is allowed to foam. Example 1 shows the results of varying the flame retardant components for a typical flexible polyurethane foam formulation. EXAMPLE 1

| | |
|---|---|
| Polyether Polyol (3000 MW triol) | 100.0 |
| Silicone surfactant | 1.0 |
| Water | 4.4 |
| Trichlorofluoromethane* | 6.0 |
| 33-LV (amine catalyst)** | 0.1 |
| Stannous octoate catalyst | 0.25 |
| TDI (toluene diisocyanate) | 56.3 |

*Auxiliary blowing agent
**DABCO Catalyst (Trademark of AIR PRODUCTS)

In the following Table I, the results of adding varying amounts of TDCP and PAP are tabulated showing flame test results from the testing with the Cal 117 test method. The first column refers to the Sample or Foam #. The next three columns show the total amount of flame retardant and the amount of each component in weight parts per hundred parts by weight of the polyol.

The last two columns describe the foam by standard density and porosity test results.

The three middle columns show the results of the Cal 117 Standard testing. Wt. % is the smoulder test results and refers to the retained uncharred sample weight compared to the original weight. An 80% retained weight is passing - thus all samples passed by a wide margin.

Unaged and aged refer to the vertical flame test, and include the number of inches charred and whether the burning continued beyond a maximum time. A passing rating (P) is basically attained when the average char distance does not exceed 6 inches and the average after flame does not exceed 5 seconds. A failing rating (F) is given when the average results exceed passing values or when the char length of one or more individual specimens or samples exceed 8 inches or when the after flame of one or more samples exceed 10 seconds.

TABLE I

EXAMPLE 1 formulation with different amounts of flame-retardant components, showing the results of testing

| Foam# | Fire Retardant[a] | | | CAL-117 Burn tests | | | porosity-density | |
|---|---|---|---|---|---|---|---|---|
| | total | TDCP | PAP | wt %[b] | not-aged[c] | aged[c] | SCFM | PCF |
| 17-75 | 5.5 | 5.5 | 0.0 | 99 | 10.0(F) | 8.3(F) | 2.5 | 1.4 |
| 17-75D | 5.5 | 0.0 | 5.5 | 99 | 9.0(F) | 12.0(F) | 4.2 | 1.4 |
| 17-76 | 7.0 | 7.0 | 0.0 | 99 | 3.7(P) | 7.2(F) | 2.9 | 1.4 |
| 17-76D | 7.0 | 0.0 | 7.0 | 99 | 10.4(F) | 12.0(F) | 2.9 | 1.4 |
| 17-77 | 8.5 | 8.5 | 0.0 | 99 | 5.4(P*) | 3.9(P*) | 2.6 | 1.4 |
| 17-77D | 8.5 | 0.0 | 8.5 | 99 | 8.6(F) | 12.0(F) | 3.8 | 1.4 |
| 17-78 | 10.0 | 10.0 | 0.0 | 99 | 3.2(P) | 2.4(P) | 2.4 | 1.4 |
| 17-78D | 10.0 | 0.0 | 10.0 | 99 | 12.0(F) | 10.2(F) | 4.0 | 1.4 |
| 17-79 | 11.5 | 11.5 | 0.0 | 99 | 3.5(P) | 2.8(P) | 2.4 | 1.5 |
| 17-79D | 11.5 | 0.0 | 11.5 | 99 | 6.6(F) | 12.0(F) | 3.9 | 1.4 |
| 17-80 | 13.0 | 13.0 | 0.0 | 99 | 2.3(P) | 2.3(P) | 2.1 | 1.4 |
| 17-80D | 13.0 | 0.0 | 13.0 | 99 | 3.7(P) | 8.6(F) | 3.5 | 1.5 |
| 17-78A | 10.0 | 7.5 | 2.5 | 99 | 2.9(P) | 2.6(P) | 2.6 | 1.4 |
| 17-78B | 10.0 | 5.0 | 5.0 | 99 | 3.4(P) | 3.4(P) | 3.4 | 1.4 |
| 17-78C | 10.0 | 2.5 | 7.5 | 99 | 4.0(P*) | 10.2(F) | 3.7 | 1.4 |
| 17-79A | 11.5 | 8.6 | 2.9 | 99 | 3.5(P) | 2.6(P) | 2.4 | 1.5 |
| 17-79B | 11.5 | 5.8 | 5.8 | 99 | 2.5(P) | 3.6(P) | 2.6 | 1.4 |
| 17-79C | 11.5 | 2.9 | 8.6 | 99 | 3.9(P) | 3.7(P) | 3.2 | 1.4 |

[a] = amounts are parts per hundred parts polyol
[b] = Cal 117, Section B, Part II (average wt. % retained, 5 specimens)
[c] = Cal 117, Section A, Part 1 (average distance charred, 5 specimens)
(P) = All 5 Samples met extinguishing time and char distance requirements
(P*) = 4 of 5 Samples met extinguishing time and char distance requirements
(F) = 2 or more samples failed the distance, after flame or average requirements

EXAMPLE 2

| Ingredients | Parts by Weight |
|---|---|
| Polyester polyol (3000 MW triol) | 100.0 |
| Silicone surfactant | 1.0 |
| Water | 4.5 |
| $CH_2Cl_2$ | 8.0 |
| A-1 NIAX (amine catalyst)* | 0.1 |
| Stannous octoate catalyst | 0.2 |
| TDI toluene diisocyante | 60.6 |
| TDCP | 9.1 |
| PAP | 4.9 |
| NCO/OH Ratio | 1.16 |
| FOAM PROPERTIES | |
| Density, PCF | 1.25 |
| Porosity, SCFM | 6.2 |
| CAL 117 smoulder, % wt. Retained | 99 |

-continued

| Ingredients | Parts by Weight |
| --- | --- |
| Inches Charred Unaged | 2.4 |
| Inches Charred Aged | 3.7 |
| Time, Sec., Unaged | 1.5 |
| Time, Sec., Aged | 1.3 |
| LARGE POUR DATA | |
| Rise Time, Sec. | 155 |
| Exotherm, ° C. Max | 151 |

\* = Trademark of Union Carbide
Outstanding smolder and low scorch properties were observed for this high porosity foam as required for hospital pad applications.

EXAMPLE 3

| | Flexible Polyester Urethane Foam | | |
| --- | --- | --- | --- |
| | Parts by Weight | | |
| Ingredients | 3a | 3b | 3c |
| Foamrez 76* (polyester polyol) | 100.0 | 100.0 | 100.0 |
| L-532 (surfactant)** | 1.0 | 1.0 | 1.0 |
| Water | 3.6 | 3.6 | 3.6 |
| B-16 (catalyst)*** | 0.2 | 0.2 | 0.2 |
| M-75 (catalyst)**** | 2.0 | 2.0 | 2.0 |
| TDI | 51.0 | 51.0 | 51.0 |
| TPCP | 5.2 | 6.5 | 7.8 |
| PAP | 2.8 | 3.5 | 4.2 |
| NCO/OH Ratio | 1.15 | 1.15 | 1.15 |
| FOAM PROPERTIES | | | |
| Density, PCF | 1.83 | 1.76 | 2.15 |
| Porosity, SCFM | .33 | .28 | .91 |
| Flame test | | | |
| Rating | SE | SE | SE |
| Dist. Charred, in | 1.5 | 1.5 | 1.5 |

\* = Trademark of Witco Chemical
\*\* = a silicone surfactant (Trademark of Union Carbide)
\*\*\* = BAIRCAT B-16 Catalyst (Trademark of Lonza Co.)
\*\*\*\* = THANCAT M-75 (Trademark of Texaco Chemical Co.)

DISCUSSION

The most preferred embodiment of the present invention flame retardant composition is a blend of the PAP and the TDCP. The blends can range from 5 to 95% TDCP with the remainder being PAP. For use with urethane foam formulations containing 25 to 75% TDCP with the remainder PAP have been found particularly good especially when there is at least 50-75% TDCP present in the mixture and an approximately 60-70% TDCP and the remainder PAP (that is, approximately 65% TDCP to 35% PAP mixture) appears to be a very good composition because it can be used at lower levels and still ensure good results. However, as shown in Table 1 (Foam #17-79c) passing results were attained when a preponderance of PAP is present.

Although TDCP sold commercially as ANTIBLAZE 195 brand flame retardant (trademark of Albright & Wilson Americas for TDCP) works quite well as a flame retardant, as can be seen from Table 1 above, there is a requirement of about 10 parts per hundred parts required of this component for assured passing of the vertical flame test.

There appears to be a synergistic effect when both TDCP and PAP are combined for use as a flame retardant. In this respect, attention is directed to the Foam Nos. 17-78A and 17-78B. Each of these uses a total of 10 parts flame retardant per 100 parts polyol. Based on the test data for TDCP and PAP alone, a mixture of these used at a rate of 10 parts per hundred parts polyol cannot be expected to be adequate. 10 parts TDCP alone is just adequate. Up to the test amount of PAP (13 parts) is not sufficient. However, when TDCP and PAP are used in equal proportions, a total of 10 parts per 100 parts is sufficient to give a good passing rating. Thus, although PAP alone does not provide sufficient flame retardancy at 10 or even 13 parts (Foam #17-80D), when used in combination with TDCP, the flame retardant ability of both components appears to be enhanced.

In summary, comparing Foam #17-78B with 17-78, one notes that similar results are obtained with 10 parts per 100 parts total of flame retardant. The difference is that 17-78 uses only TDCP while 17-78A through 17-78B uses a mixture of PAP and TDCP. Since less than 10 parts of TDCP was not quite adequate and no amount of PAP (within the test amounts of up to 13 parts) would work, it is surprising that mixing them together at any amount results in excellent flame retardant properties at the 10 parts level.

Although the individual components can be added separately from each other either alone or in combination with other raw materials, premixing the two components has a number of advantages in addition to convenience for the end user:

1. TDCP has been found to freeze readily in the winter especially in colder climates, when shipped or stored. Adding PAP to the mixture significantly depresses the freezing point of the mixture.

2. TDCP has a high viscosity. This makes handling it sometimes difficult. Furthermore, when metered into a continuous reaction chamber for mixing, the lower the viscosity the better the mixing would be expected. Also, metering or pumping becomes easier. Thus, a lower viscosity mixture is preferable. The mixture of TDCP and PAP has a lower viscosity than TDCP alone.

3. PAP is less expensive than TDCP. Therefore a blend has a cost advantage.

In addition to the above, the use of the two components whether premixed or mixed in situ has a number of advantages over TDCP alone as follows:

The mixed components have been shown in early testing to have improved hydrolytic stability as compared with using TDCP alone. This is important in polyester foam formulations since flame retardants which breakdown to form acids will acid catalyze the breakdown of polyesters. The result is a flexible foam which loses most of its mechanical properties. Thus, the present invention provides a flame retardant which will be useful in polyesters.

The present invention provides a flame retardant which does not simultaneously decrease the cure rate and may reduce the cure times of the polyurethane foam compared with other flame retardants. This helps reduce the inventory which must be maintained during post-foaming curing. One important use of the foam according to the present invention is in hospital pads. These are normally stored and shipped tightly rolled to save space and reduce shipping costs. However, if they are tightly rolled before the curing is completed the tight roll shape may become permanent. Thus, when the tight roll is cut loose instead of popping open it remains in an unsuitable compressed state. Thus, a rapid cure rate will reduce costs from an inventory point of view.

The above is illustrative but not limitative of the present invention.

What is claimed is:

1. A composition consisting essentially of about 5 to 95% of tris (monochloroalkyl, dichloroalkyl or a mixture thereof) phosphate and the remainder is a phenyl phosphate ester which is an alkylated triphenyl phosphate having an approximate average formula $(R_xArO)_3PO$ wherein x ranges from 1 to 2, each R is individually selected from the group consisting of hydrogen, $C_1$-$C_4$ alkyl and Ar is phenyl.

2. The composition of claim 1, consisting essentially of about 25 to about 75% said trisphosphate and the remainder said alkylated triphenyl phosphate.

3. The composition of claim 1, consisting essentially of about 50 to 75% said trisphosphate and the remainder said alkylated triphenyl phosphate.

4. The composition of claim 1, consisting essentially of about 30-40% said alkylated triphenyl phosphate and about 60-70% said trisphosphate.

5. The composition of claim 1, consisting essentially of about 50% said trisphosphate and about 50% said alkylated triphenyl phosphate.

6. The composition of claim 1, consisting essentially of 5% said trisphosphate and the remainder said alkylated triphenyl phosphate.

7. In a flexible urethane foam composition of the type being formed by mixing isocyanates and polyether or polyester polyols along with various surfactants, water, auxiliary blowing agents and catalysts, and reacting the mixture; the improvement comprising:
    8 to 14 parts per 100 parts polyol of the composition of claim 1.

8. In a flexible urethane foam composition of the type being formed by mixing isocyanates and polyether or polyester polyols along with various surfactants, water, auxiliary blowing agents and catalysts, and reacting the mixture; the improvement comprising:
    8 to 14 parts per 100 parts polyol of the composition of claim 3.

9. In a flexible urethane foam composition of the type being formed by mixing isocyanates and polyether or polyester polyols along with various surfactants, water, auxiliary blowing agents and catalysts, and reacting the mixture; the improvement comprising:
    8 to 14 parts per 100 parts polyol of the composition of claim 4.

10. In a flexible urethane foam composition of the type being formed by mixing isocyanates and polyether or polyester polyols along with various surfactants, water, auxiliary blowing agents and catalysts, and reacting the mixture; the improvement comprising:
    10 to 12 parts per 100 parts polyol of the composition of claim 1.

11. In a flexible urethane foam composition of the type being formed by mixing isocyanates and polyether or polyester polyols along with various surfactants, water, auxiliary blowing agents and catalysts, and reacting the mixture; the improvement comprising:
    10 to 12 parts per 100 parts polyol of the composition of claim 2.

12. In a flexible urethane foam composition of the type being formed by mixing isocyanates and polyether or polyester polyols along with various surfactants, water, auxiliary blowing agents and catalysts, and reacting the mixture; the improvement comprising:
    10 to 12 parts per 100 parts polyol of the composition of claim 3.

13. In a flexible urethane foam composition of the type being formed by mixing isocyanates and polyether or polyester polyols along with various surfactants, water, auxiliary blowing agents and catalysts, and reacting the mixture; the improvement comprising:
    10 to 12 parts per 100 parts polyol of the composition of claim 4.

14. In a flexible urethane foam composition of the type being formed by mixing isocyanates and polyether or polyester polyols along with various surfactants, water, auxiliary blowing agents and catalysts, and reacting the mixture; the improvement comprising:
    8 to 14 parts per 100 parts polyol of the composition of claim 6.

15. In a flexible urethane foam composition of the type being formed by mixing isocyanates and polyether or polyester polyols along with various surfactants, water, auxiliary blowing agents and catalysts, and reacting the mixture; the improvement comprising:
    8 to 14 parts per 100 parts polyol of a total of a tris(monochloroalkyl, dichloroalkyl or mixture thereof) phosphate and a phenyl phosphate ester which is an alkylated triphenyl phosphate having an approximate average formula $(R_xArO)_3PO$ wherein x ranges from 1 to 2, each R is individually selected from the group consisting of hydrogen, $C_1$-$C_4$ alkyl and Ar is phenyl;
    said trisphosphate and said alkylated triphenyl phosphate being present in a ratio effective to impart flame retardant properties to said foam.

16. The composition of claim 15, wherein the said trisphosphate to said alkylated triphenyl phosphate ratio by weight percent is 5 to 95 said trisphosphate to 5 to 95 said alkylated triphenyl phosphate.

17. The composition of claim 16, wherein the total of said trisphosphate and said alkylated triphenyl phosphate is 10 to 12 parts.

18. The composition of claim 16, wherein the ratio is 25 to 50 said alkylated triphenyl phosphate and 75 to 50 said trisphosphate.

19. The composition of claim 16, wherein the ratio is 30 to 40 said alkylated triphenyl phosphate and 60 to 70 said trisphosphate.

20. The composition of claim 1, wherein said trisphosphate is TDCP and said alkylated triphenylphosphate is PAP.

21. The composition of claim 7, wherein said trisphosphate is TDCP and said alkylated triphenylphosphate is PAP.

22. The composition of claim 15, wherein said trisphosphate is TDCP and said alkylated triphenylphosphate is PAP.

* * * * *